Patented Aug. 1, 1950

2,517,070

UNITED STATES PATENT OFFICE 2,517,070

CALCINED GYPSUM CASTINGS AND PROCESS OF MAKING

John K. Wise, Evanston, Ill., assignor to United States Gypsum Company, Chicago, Ill., a corporation of Illinois No Drawing. Application March 26, 1948,
Serial No. 17,385

6 Claims. (Cl. 106—114)

The present invention relates to gypsum plasters and plaster products during the manufacture of which the gauged plaster has a predetermined and controllable consistency and also deals with materials for effecting these results, and with methods for producing these substances.

It has long been known that calcined gypsum plasters, when mixed with water will re-combine therewith and will set up to produce finished articles generally known as gypsum castings. Such castings, however, have certain deficiencies, primarily their lack of density and strength.

Many methods have been proposed in the past to overcome these difficulties, some of the methods involving the addition of various set controlling and consistency controlling chemicals, while others have attempted to solve the problem by merely moistening the gypsum with sufficient water to cause it to set, followed by physical compression of the dampened calcined gypsum powder so that a dense product would result.

Still other methods have involved the impregnation of finished gypsum castings by various impregnating materials such as resins, sulfur and the like, in an attempt to fill the interstices of the gypsum castings with reinforcing materials.

Thus it has long been known that the addition of certain gums, carbohydrates, etc., to ordinary gypsum plasters, that is to say, various forms of partially dehydrated gypsum such as the hemihydrate and the soluble anhydrites, will confer marked improvements to gypsum products containing them. Gelatinized starch had been found to be particularly advantageous in this respect as admixtures thereof with plaster showed considerably increased strength as compared with neat plaster casts of the same apparent density. However, this expedient carries with it certain other defects, particularly because the incorporation of gelatinized starch into the gauging water made it necessary to use considerably greater quantities thereof as compared with ordinary water. Expressed in another way, this meant that the so-called "consistency" of the plaster was considerably increased, with the concomitant result that the finished product was of less density than desired, because the evaporation of the excess water quite expectedly left voids behind which correspond to the space the water had occupied.

One particular method which attempts to overcome this difficulty is described in the patent to Hoggatt 2,388,543, who proposes to admix raw or ungelatinized starch with a calcined gypsum plaster, and then to cast the resulting slurry into the desired shape. After the plaster has set he proposes to heat the material while still undried to a temperature sufficiently high to effect the gelatinization of the starch. By this method Hoggatt is able to prepare a plaster cast reinforced with starch, but having a higher density and consequently a higher strength than was possible by the use of pre-gelatinized starch. This method, however, is subject to certain serious practical disadvantages. In the first place, the heat required to gelatinize the starch in the casting tends partially to re-calcine the same, therefore impairing its strength.

Hoggatt suggests therefore that the heating of the casts be accomplished either in water or at least in water vapor to prevent such re-calcination. This, however, by reason of the solubility of calcium sulfate in water, quite naturally leaches some of it from the casting, and therefore destroys the sharpness of reproduction of the mold details. Moreover, the process is only applicable to comparatively small castings such as are portable and can be placed in a suitable container or oven.

It will therefore be appreciated by those familiar with the plaster castings industry, that any process which enables the production of a casting of enhanced strength and containing certain quantities of starch without simultaneous increase in the consistency of the mixture will have many commercial advantages. This is particularly true if the consistency can be predetermined and controlled.

The present invention aims to accomplish just this.

It is therefore an object of the present invention to provide calcined gypsum plasters and set cast gypsum plaster products which are reinforced with starch, but in which the calcined gypsum plaster mixtures are characterized by a controlled and reproducible consistency which may be varied over a wide range.

It is a further object of the present invention to provide such castings by a process wherein the heating of the finished castings will not be required.

It is a further object of the present invention to provide calcined gypsum mixtures containing a reaction product of a farinaceous material and an aldehyde, such as formaldehyde.

It is a further object of the present invention to control the consistency of gauged mixtures of calcined gypsum and water by the use of compounds which are the reaction product of starch and formaldehyde.

Other objects of the present invention will become apparent from the ensuing description of the invention and from the hereunto appended claims.

I have discovered that these and other desirable objects may be achieved by gauging calcined gypsum with aqueous solutions containing starch which has been gelatinized in the presence of formaldehyde. I have found that in contrast with ordinary gelatinized starch, that starch which has been gelatinized in the presence of formaldehyde will be productive of a gypsum plaster having a much lower consistency than it would have when gauged with a gelatinized starch solution or dispersion containing the same amount of starch, but which had not been gelatinized in the presence of formaldehyde.

The present invention will be more particularly described with reference to the particular type of gypsum plaster known as "alpha" gypsum, which is the product described in the United States patent to Randel and Dailey No. 1,901,051, when used conjointly with an acid-hydrolyzed corn starch having a so-called fluidity of 75; but it will be obvious that the general principles disclosed herein are equally applicable to other plasters and other starches.

Purely for purposes of exemplification, but without in any way limiting the scope of the present invention, the following examples are given:

Example 1

| | |
|---|---|
| 75 fluidity starch | grams 100 |
| Formalin (containing 37% actual formaldehyde) | milliliters 25 |
| Water | grams 373 |

The above ingredients were mixed and the hydrogen-ion concentration of the mixture was adjusted to a pH of 5.34. The resulting batch was then heated to 85° C. and held within a temperature range of from about 85–90° C. for 15 minutes, after which it was neutralized (i. e., adjusted to pH 7.0) and allowed to cool to room temperature. In the above example the term "fluidity" as applied to the starch has reference to the viscosity of a starch solution, such for example as has been described on page 95 of Kerr's "Chemistry and Industry of Starch" published in 1944 by Academic Press, Inc. The test method employed for determining the fluidity of such starch is quoted from the said publication as follows:

"5 gram of starch, dry weight basis, are wet with 10 cc. of distilled water, in a Pyrex beaker. At 25° C., 90 cc. of a 1% solution of sodium hydroxide are added, with stirring, and the stirring is continued for 3 minutes from the time the sodium hydroxide is poured in. The mixture is allowed to stand 27 minutes more at 25° C. At this time the contents are poured into a standardized glass funnel with a special tip and the quantity of starch solution which runs from the funnel in 70 sec. at 25° C. is noted. This amount, measured in cubic centimeters, is taken as the fluidity; . . ."

The starch-formaldehyde product as above made and which was in the form of a more or less limpid liquid was tested with alpha gypsum using a mixture corresponding to 95% by weight of plaster and a sufficient quantity of the starch-formaldehyde reaction product to correspond to 5% of starch. The consistency of this mixture was found to be 44. The term "consistency" as used herein is well understood in the industry and is expressed as the number of milliliters of water required to produce a pourable mixture with 100 grams of solids. When the same "additive," by which term I shall hereinafter designate the starch-formaldehyde reaction product, was tried out in the ratio of 90% by weight of alpha gypsum and on the equivalent of 10% of starch, the consistency was found to be 50. By comparison, a sample of the same starch gelatinized in the same amount of water and then tested with the same alpha gypsum was found to produce a consistency of 74 with 5% of starch and 99 at 10% of starch.

It will thus be seen that the consistency which ordinarily would be tremendously increased by the use of starch alone was but very slightly increased if the starch, instead of having been gelatinized with water alone, had been gelatinized in the presence of formaldehyde. Although in Example 1, and in the other examples that are to be given, commercial Formalin has been used as the source of formaldehyde, it will be within the purview of the present invention to employ other sources or forms of formaldehyde, such, for example, as paraformaldehyde, or its compounds, such as hexamethylenetetramine, etc.

The 75% fluidity starch may be substituted by other acid-hydrolyzed starches of other viscosities, as well as by oxidized starch, heat-converted starches, enzyme-converted starches, and various types of dextrin. Raw starches may also be used, and, in any event, the source of the starch may be chosen from a rather wide field, such as potato, tapioca, sweet potato, wheat, rye, etc. It will also be evident that plasters other than alpha gypsum may be employed, such, for example, as ordinary kettle calcined gypsum, such as commercial stucco.

*Examples 2, 3, and 4.*—By reason of their similarity the next three examples can be given in tabular form, giving all the necessary data, it being understood that the manipulative steps were the same as those in Example 1. The only differences are the relative amounts of water and formaldehyde. The consistencies of the alpha gypsum are also given for various concentrations of starch. In these examples the hydrogen-ion concentration was measured, but no attempt was made to control it.

| | Example No. 2 | Example No. 3 | Example No. 4 |
|---|---|---|---|
| 75 fluidity starch g | 100 | 100 | 100 |
| Formalin (37%) ml | 15 | 5 | 35 |
| Water g | 383.8 | 394.6 | 362.2 |
| pH | 6.2 | 6.3 | 6.0 |
| Time min | 15 | 15 | 15 |
| Temp °C | 85–90 | 85–90 | 85–90 |
| Starch solids per cent | 20 | 20 | 20 |
| Consistency with "alpha" gypsum at— | | | |
| 1% starch | | | 41 |
| 2% starch | | | 41 |
| 5% starch | 56 | 70 | |
| 10% starch | 64 | 88 | 40 |

From the above data (Examples 1 through 4) it will be evident that the reduction in consistency is at least roughly proportional to the amount of formaldehyde which has been allowed to react with the starch. It might be noted in passing that Formalin alone when added to gauging water has a very slight effect of lowering the consistency of alpha gypsum and the like; but such reduction is of vastly less magnitude than the reduction which may be effected in the normal consistency of alpha gypsum when gauged with water containing ordinary gelatinized starch.

From the above examples it will further be evident that many advantages result from the use of the present invention because it enables the introduction into cast gypsum products of much larger amounts of starch than would normally be possible without simultaneously introducing inordinate amounts of water.

The present invention is of course not limited in any respect to any particular instrumentalities of apparatus and is to be construed merely in accordance with the subjoined claims, taking into due consideration the use of known equivalents.

I claim:

1. A set calcined gypsum plaster product resulting from the setting of a mixture of calcined gypsum and an aqueous gauging fluid containing from about 1% to about 10% by weight, as calculated on the weight of the calcined gypsum, of a farinaceous material from the group consisting of starches and dextrines that has been reacted with formaldehyde by having been heated in an aqueous solution of formaldehyde.

2. A product such as defined in claim 1 in which the calcined gypsum is alpha gypsum hemihydrate.

3. A set calcined gypsum plaster product resulting from the setting of a mixture of alpha gypsum hemihydrate and an aqueous gauging fluid containing from about 1% to about 10% by weight, as calculated on the weight of said alpha gypsum hemihydrate, of a starch that has been reacted with formaldehyde by having been heated in an aqueous solution of formaldehyde.

4. Process of producing gypsum castings containing a farinaceous product from the group consisting of starches and dextrins, said castings being characterized by having a greater density than that of a gypsum casting containing an equivalent amount of gelatinized starch, which comprises producing a gauging liquid containing such a farinaceous product that has been reacted with formaldehyde by having been heated in an aqueous solution of formaldehyde, gauging calcined gypsum with said liquid, and forming the resulting slurry into predetermined form.

5. The process as defined in claim 4 in which the calcined gypsum is alpha gypsum hemihydrate.

6. Process of producing gypsum castings containing a starch product, said castings being characterized by having a greater density than that of a gypsum casting containing an equivalent amount of gelatinized starch, which comprises producing a gauging liquid containing starch that has been reacted with formaldehyde by having been heated in an aqueous solution of formaldehyde, gauging alpha gypsum with said liquid, and forming the resulting slurry into predetermined form.

JOHN K. WISE.

REFERENCES CITED

The following references are of record in the file of this patent:

UNITED STATES PATENTS

| Number | Name | Date |
|---|---|---|
| 1,996,372 | Gardner | Apr. 2, 1935 |
| 2,099,765 | Horst | Nov. 23, 1937 |

FOREIGN PATENTS

| Number | Country | Date |
|---|---|---|
| 385,658 | Great Britain | 1933 |